(12) United States Patent
Nagai et al.

(10) Patent No.: US 10,400,660 B2
(45) Date of Patent: Sep. 3, 2019

(54) COOLING SYSTEM CONTROLLER AND METHOD OF CONTROLLING COOLING SYSTEM

(71) Applicant: NISSAN MOTOR CO., LTD., Yokohama-shi, Kanagawa (JP)

(72) Inventors: Hiroyuki Nagai, Kanagawa (JP); Toru Fukami, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 319 days.

(21) Appl. No.: 15/112,705

(22) PCT Filed: Feb. 20, 2014

(86) PCT No.: PCT/JP2014/054095
§ 371 (c)(1),
(2) Date: Jul. 20, 2016

(87) PCT Pub. No.: WO2015/125260
PCT Pub. Date: Aug. 27, 2015

(65) Prior Publication Data
US 2016/0341100 A1 Nov. 24, 2016

(51) Int. Cl.
*F01P 7/16* (2006.01)
*F01N 3/02* (2006.01)
(Continued)

(52) U.S. Cl.
CPC .............. *F01P 7/16* (2013.01); *F01N 3/0205* (2013.01); *F01N 5/02* (2013.01); *F01P 3/20* (2013.01);
(Continued)

(58) Field of Classification Search
CPC ........ F01P 7/16; F01P 3/20; F01P 5/10; F01P 2060/08; F01P 2060/16; F01P 2007/146;
(Continued)

(56) References Cited

U.S. PATENT DOCUMENTS 6,539,899 B1 * 4/2003 Piccirilli ................. F01P 7/167
123/41.08
2002/0189555 A1 12/2002 Murakami et al.

FOREIGN PATENT DOCUMENTS

JP 2002-371848 A 12/2002
JP 2007-218115 A 8/2007
(Continued)

*Primary Examiner* — Laert Dounis
*Assistant Examiner* — Kelsey L Stanek
(74) *Attorney, Agent, or Firm* — Drinker Biddle & Reath LLP

(57) ABSTRACT

A cooling system controller controls a cooling system at least having a coolant pump (3) configured to supply a coolant to an internal combustion engine, a heat radiator (9) configured to cool the coolant, and an exhaust heat recovery system (6) configured to perform in heat exchange between the exhaust gas and the coolant. In addition, the cooling system controller (12) has a unit configured to control the coolant flow rate, a unit (13) configured to obtain a coolant temperature or pressure of the internal coolant passage of the engine, and a unit configured to obtain an internal coolant temperature or pressure of the exhaust heat recovery system. Furthermore, the coolant flow rate is restricted at a cold start of the internal combustion engine, and the restriction of the coolant flow rate is released on the basis of the coolant temperature or pressure of the engine coolant passage and the internal coolant temperature or pressure of the exhaust heat recovery system.

9 Claims, 11 Drawing Sheets

(51) Int. Cl.
  *F01N 5/02*  (2006.01)
  *F01P 3/20*  (2006.01)
  *F01P 5/10*  (2006.01)
  F01P 7/14  (2006.01)
  F02M 26/22  (2016.01)
(52) U.S. Cl.
  CPC ............ *F01P 5/10* (2013.01); *F01N 2410/00* (2013.01); *F01P 2007/146* (2013.01); *F01P 2060/08* (2013.01); *F01P 2060/16* (2013.01); *F02M 26/22* (2016.02); *Y02T 10/16* (2013.01)
(58) Field of Classification Search
  CPC ...... F01N 3/0205; F01N 5/02; F01N 2410/00; F02M 26/22; Y02T 10/16
  USPC .......................................................... 60/320
  See application file for complete search history.

(56) References Cited

FOREIGN PATENT DOCUMENTS

| | | | |
|---|---|---|---|
| JP | 2008-157090 | A | 7/2008 |
| JP | 2008-274885 | A | 11/2008 |
| JP | 2012-021421 | A | 2/2012 |
| JP | 2012021421 | A * | 2/2012 |

* cited by examiner

COOLING SYSTEM CONTROLLER AND METHOD OF CONTROLLING COOLING SYSTEM

TECHNICAL FIELD

The present invention relates to a cooling system control of an internal combustion engine.

BACKGROUND ART

JP 2008-274885 A discloses a configuration that has an exhaust heat recovery system provided in an exhaust passage to recover heat of an exhaust gas to a coolant by internally flowing the coolant passing through an internal combustion engine. In addition, JP 2008-274885 A discloses a control selecting a higher value out of a coolant flow rate necessary to prevent boiling of the coolant inside an internal combustion engine and a coolant flow rate necessary to prevent boiling of the coolant inside an exhaust heat recovery system, and using the selected value as a flow rate of the coolant circulating inside a cooling system.

Meanwhile, JP 2007-218115 A discloses a control in which a coolant flow rate is restricted at the start of the internal combustion engine (zero flow control), and the restriction of the coolant flow rate is released as the coolant temperature at an outlet duct of the engine reaches a valve open temperature of an automatic temperature controller. In the control disclosed in JP 2007-218115 A, the coolant flow rate passing through the internal combustion engine is restricted at the engine start, so that a heat amount dissipated to the coolant from the internal combustion engine is restricted. Therefore, it is possible to shorten a time period until the internal combustion engine is warmed up (warm-up time). In addition, the restriction of the coolant flow rate is released as the coolant temperature reaches the valve open temperature of the automatic temperature controller, so that it is possible to prevent boiling of the coolant.

SUMMARY OF INVENTION

However, JP 2008-274885 A fails to disclose a control for shortening the warm-up time at the event of a cold start. Meanwhile, JP 2007-218115 A fails to consider a configuration of the exhaust heat recovery system provided in the exhaust passage.

That is, there is no discussion in the prior art for a control of the system that has the exhaust heat recovery system, capable of shortening the warm-up time as well as preventing boiling of the coolant. In addition, even when the technique of JP 2007-218115 A is combined with the technique of JP 2008-274885 A, there is still worry about boiling of the internal coolant of the exhaust heat recovery system before the restriction of the coolant flow rate is released.

It is therefore an object of the present invention to provide a cooling system controller capable of preventing boiling of the coolant inside both the internal combustion engine and the exhaust heat recovery system as well as shortening the warm-up time after a cold start in the system that has the exhaust heat recovery system provided in the exhaust passage.

According to an aspect of this invention, there is provided a cooling system controller for controlling a cooling system at least having a coolant pump configured to supply a coolant to an engine coolant passage provided in an internal combustion engine, a heat radiator configured to radiate heat from the coolant passing through the engine coolant passage to the external air to lower a temperature of the coolant, and an exhaust heat recovery system configured to perform heat exchange from the exhaust gas of the internal combustion engine to the coolant.

DESCRIPTION OF EMBODIMENTS

A description will now be made for embodiments of this invention with reference to the accompanying drawings.

Figure 1:
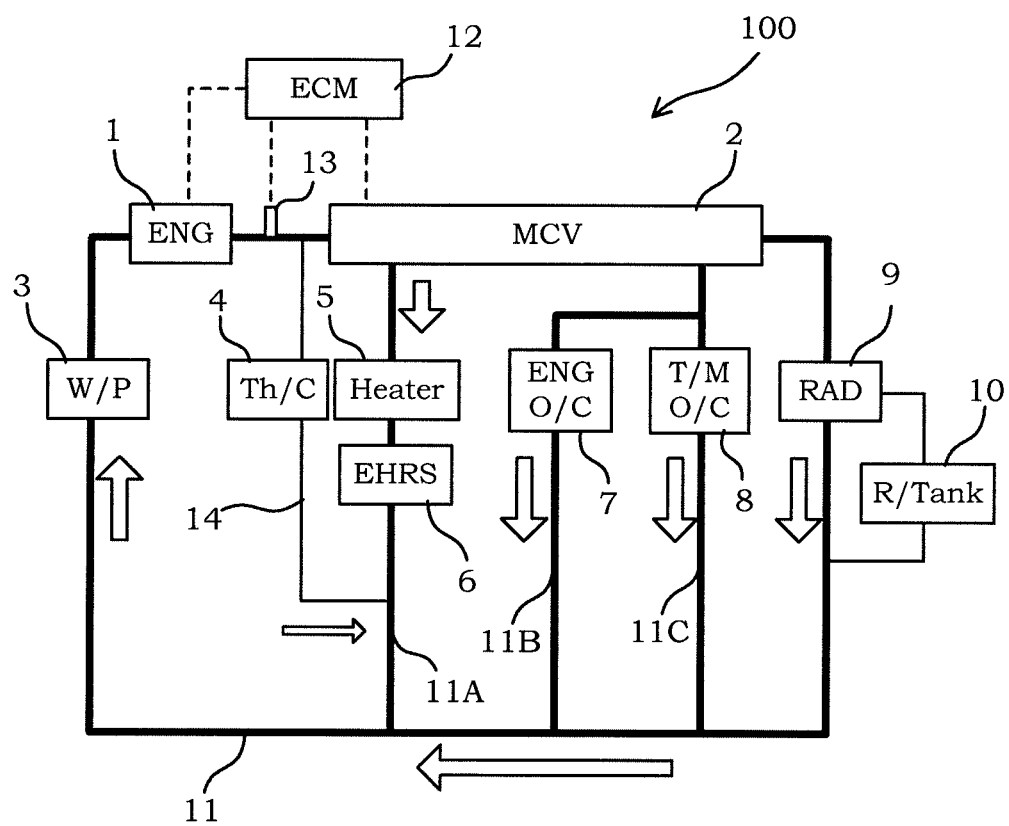
FIG. 1 is a schematic diagram illustrating a cooling system according to an embodiment of this invention.

FIG. 1 is a schematic diagram illustrating a cooling system 100 according to an embodiment of this invention. In the cooling system 100, an outlet port of a coolant passage provided in an internal combustion engine 1 (hereinafter, also referred to as an "outlet duct of an internal combustion engine 1"), an inlet port of a radiator 9, an outlet port of the radiator 9, an inlet port of the coolant passage provided in the internal combustion engine 1 (hereinafter, also referred to as a "inlet duct of the internal combustion engine 1") are connected to each other through a coolant passage 11. A water pump (coolant pump) 3 is interposed between the outlet port of the radiator 9 and the inlet duct of the internal combustion engine 1. It is noted that, similar to a known radiator, the radiator (heat radiator) 9 has a reservoir 10.

A coolant temperature sensor (engine-side condition obtaining unit) 13 for detecting a temperature of the coolant (hereinafter, also referred to as "coolant temperature") is arranged in the outlet duct of the coolant passage 11 of the internal combustion engine 1. The coolant temperature detected by the coolant temperature sensor 13 is read by a controller (engine control module: ECM) 12 as an exhaust heat recovery system internal-condition obtaining unit. It is noted that the coolant temperature sensor 13 is similar to a conventional sensor installed to detect a coolant temperature necessary to control the internal combustion engine in a known vehicle, and is not construed as a novel component of this invention. In addition, the coolant temperature of the outlet duct of the internal combustion engine 1 detected by the coolant temperature sensor 13 is considered as an internal coolant temperature of the coolant passage provided in the internal combustion engine 1.

The coolant is supplied to the internal combustion engine 1 by using a water pump 3. The coolant output from the internal combustion engine 1 through the coolant passage of the internal combustion engine 1 is cooled by using a radiator 9, and is then re-supplied to the internal combustion engine 1 by using the water pump 3. This cycle is repeated.

Here, the water pump 3 will be described in more detail. The water pump 3 is sufficient so long as it can variably adjust a coolant flow rate of the coolant passage 11.

Figure 2:
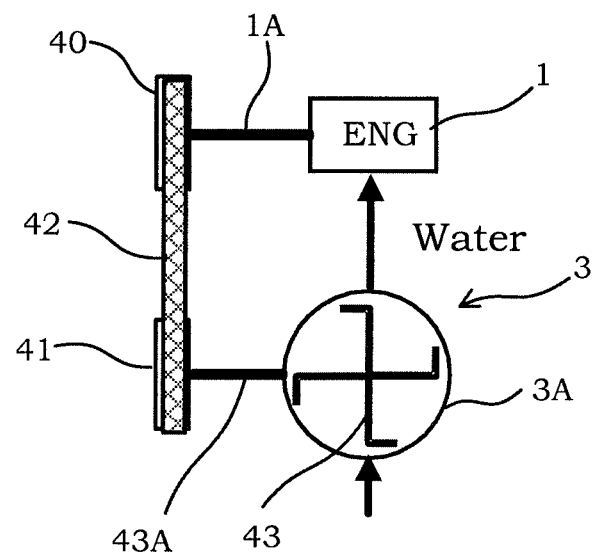
FIG. 2 is a diagram illustrating an exemplary water pump.

FIG. 2 is a schematic diagram illustrating a water pump 3 according to an embodiment of this invention. The arrows in the drawing indicate a flow of the coolant. The water pump 3 is formed by rotatably housing an impeller 43 in a housing 3A. A pump pulley installed with a clutch (coolant flow rate control unit) 41 is fixedly supported by a rotation shaft 43A of the impeller 43. A belt 42 is looped over the pump pulley 41 and an engine pulley 40 fixedly supported by the crankshaft 1A of the internal combustion engine 1. In this configuration, while the internal combustion engine 1 is operated, and the clutch of the pump pulley 41 is locked, the impeller 43 is rotated by a driving force of the internal combustion engine 1. As a result, the coolant can be supplied to the internal combustion engine 1 by using the water pump 3. As the clutch is released, the impeller 43 stops, and the supply of the coolant to the internal combustion engine 1 also stops. In this case, by intermittently locking and releasing the clutch, it is possible to control the amount of the coolant supplied to the internal combustion engine 1.

Figure 3:
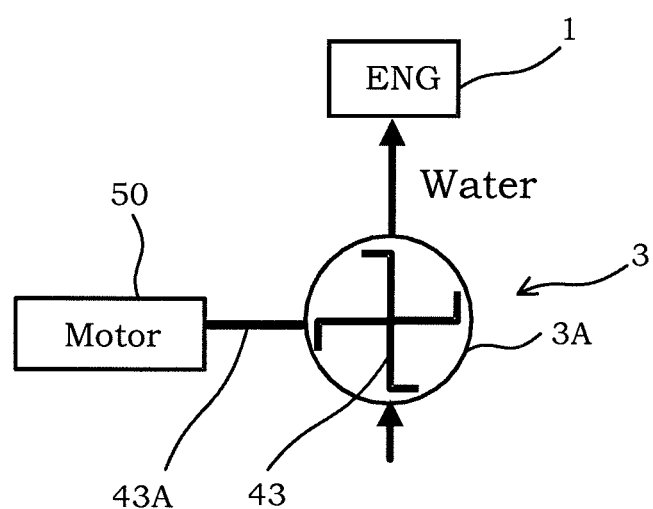
FIG. 3 is a diagram illustrating another exemplary water pump.

FIG. 3 is a schematic diagram illustrating another exemplary water pump 3 according to an embodiment. In FIG. 3, the arrows indicate a flow of the coolant. Referring to FIG. 3, similar to the configuration of FIG. 2, as the impeller 43 is rotated, the coolant is supplied to the internal combustion engine 1 by using the water pump 3. However, unlike the configuration of FIG. 2, the impeller 43 is driven by an electric motor (coolant flow rate control unit) 50. The water pump 3 of FIG. 3 can be used to control the coolant flow rate by controlling a rotation speed of the electric motor 50.

Returning to FIG. 1, between the outlet duct of the internal combustion engine 1 and the inlet port of the radiator 9, the coolant passage 11 branches to a coolant passage 11A including a heater 5 and an exhaust heat recovery system (EHRS) 6, a coolant passage 11B including an internal combustion engine oil cooler 7, and a coolant passage 11C including a transmission oil cooler 8.

It is noted that the internal combustion engine oil cooler 7 and the transmission oil cooler 8 are used to cool the engine oil and the transmission oil in a normal operation. However, when the coolant temperature is necessarily higher than the engine oil and the like in an engine start operation, they are also used to heat the engine oil and the like.

The heater 5 and the exhaust heat recovery system 6 are arranged in series with the coolant flow. In addition, the coolant passages 11B and 11C are formed by dividing a single passage at the branching point from the coolant passage 11.

The coolant passages 11A, 11B, and 11C respectively join to the coolant passage 11 output from the radiator 9 in the outlet sides of the exhaust heat recovery system 6, the internal combustion engine oil cooler 7, and the transmission oil cooler 8.

A multi-flow control valve (MCV) 2 is installed in the branching point of the coolant passage 11. In addition, a coolant passage 14 branches from the coolant passage 11 to the throttle chamber 4 between the outlet duct of the internal combustion engine 1 and the inlet port of the multi-flow control valve 2.

It is noted that the flow rate of the coolant flowing through the coolant passage 14 is remarkably lower than flow rate of the coolant flowing through the coolant passage 11, and it is nearly negligible.

Here, the multi-flow control valve 2 and the exhaust heat recovery system 6 will be described in more detail.

Figure 4:
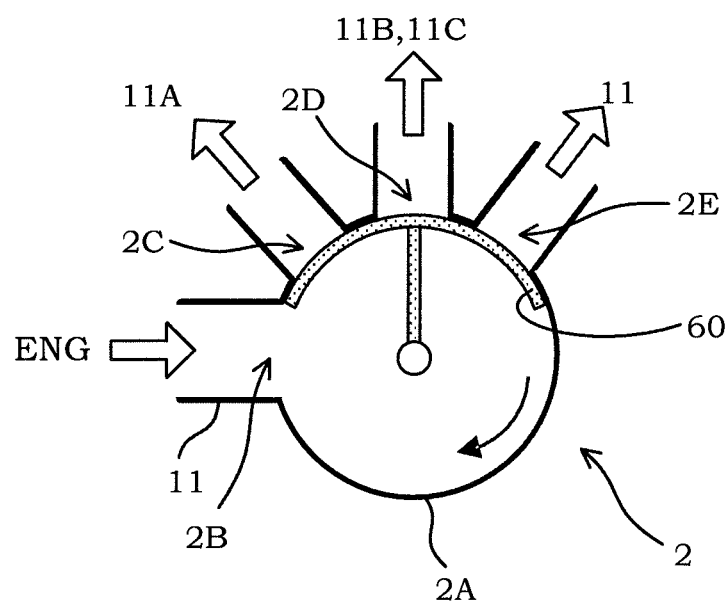
FIG. 4 is a diagram illustrating an exemplary multi-flow control valve.

FIG. 4 is a schematic diagram illustrating the multi-flow control valve 2 according to an embodiment. A housing 2A of the multi-flow control valve 2 has a pair of openings 2C and 2D in addition to an opening 2B connected to the coolant passage 11 extending from the outlet duct of the internal combustion engine 1 and an opening 2E connected to the coolant passage 11 extending to the radiator 9. The pair of openings 2C and 2D are connected to the coolant passage 11A and the passage branching to the coolant passages 11B and 11C, respectively.

A valve body 60 is rotatably housed in the housing 2A. The valve body 60 blocks overall openings 2C to 2E in a valve close state as illustrated in FIG. 4. As the valve body 60 is rotated clockwise in this state, first, the opening 2C is opened. Then, the opening 2D is opened, and finally, the opening 2E is opened. That is, by controlling a rotation angle of the valve body 60, it is possible to select the coolant flow passage.

Figure 5:
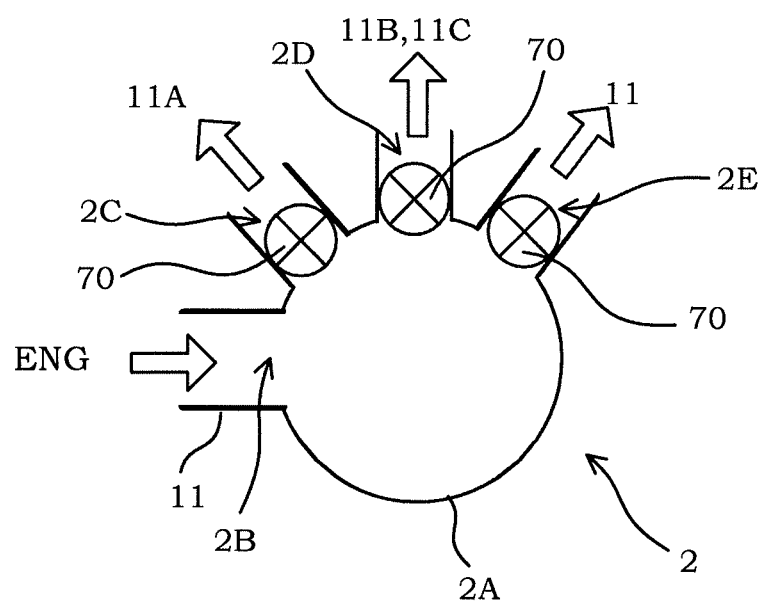
FIG. 5 is a diagram illustrating another exemplary multi-flow control valve.

FIG. 5 is a schematic diagram illustrating another exemplary multi-flow control valve 2 according to an embodiment. The multi-flow control valve 2 of FIG. 5 is provided with solenoid valves 70 in each of the openings 2C to 2E instead of the valve body 60 of FIG. 4. As a result, by controlling each solenoid valve 70, it is possible to select the coolant flow passage.

Figure 6:
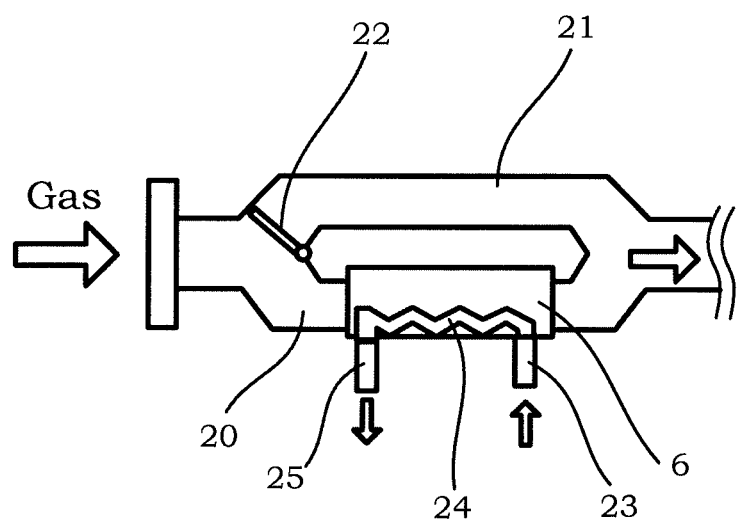
FIG. 6 is a diagram illustrating a configuration of the exhaust heat recovery system.

FIG. 6 is a schematic diagram illustrating an exhaust heat recovery system 6 according to an embodiment. The exhaust heat recovery system 6 makes it possible to perform heat exchange between the coolant and the exhaust gas of the internal combustion engine 1 to recover the heat of the exhaust gas to the coolant. The recovered heat is used, for example, to condition the air or promote an engine warm-up operation.

The exhaust heat recovery system 6 is installed in the exhaust passage of the internal combustion engine 1 and is internally provided with a heat exchange passage 24 to be exposed to the exhaust gas. The coolant passage 11A is connected to each of the inlet port 23 and the outlet port 25 of the heat exchange passage 24.

A bypass passage 21 that bypasses the exhaust heat recovery system 6 branches from the exhaust passage 20. A bypass valve 22 for selectively switching the exhaust gas flow passage to the exhaust passage 20 or the bypass passage 21 is provided at the branching point between the exhaust passage 20 and the bypass passage 21.

It is noted that a catalytic converter (not shown) for purifying the exhaust gas is arranged in the downstream side from a confluent portion between the exhaust passage 20 and the bypass passage 21.

The water pump 3, the multi-flow control valve 2, and the bypass valve 22 described above are controlled by a controller 12. The ECM 12 is a microcomputer having a central processing unit (CPU), a read-only memory (ROM), a random-access memory (RAM), and an input/output interface (I/O interface). The ECM 12 may be a plurality of microcomputers.

Next, a description will be made for a control of the cooling system in an engine start operation.

As the coolant flows through the inside of the internal combustion engine 1 at the event of a cold start, the coolant absorbs the heat generated from the internal combustion engine 1, so that the temperature rise of the internal combustion engine 1 is delayed. In this regard, the ECM 12 executes a so-called zero flow control for restricting a coolant flow rate inside the cooling system in a cold start operation.

When the coolant flow rate is restricted, the heat amount absorbed by the coolant is reduced, so that the time elapsing until the internal combustion engine 1 has a warm-up state can be shortened, compared to a case where the zero flow control is not executed.

It is noted that the "zero flow control" herein refers to an operation of reducing the coolant flow rate up to approximately 10% as well as an operation of setting the coolant flow rate to perfect zero. That is, in the configuration of FIG. 1, an operation of blocking the openings 2C to 2E by driving the water pump 3 and using the multi-flow control valve 2 is also considered as the zero flow control. In this state, while the coolant flows from the internal combustion engine 1 to the throttle chamber 4, the coolant flow rate of the coolant passage 14 is negligible as described above. Therefore, it is possible to sufficiently obtain an effect of shortening the warm-up time.

During the zero flow control, the temperature of the internal combustion engine 1 increases. Therefore, the temperature of the coolant rapidly rises after the zero flow control is released.

Figure 7:
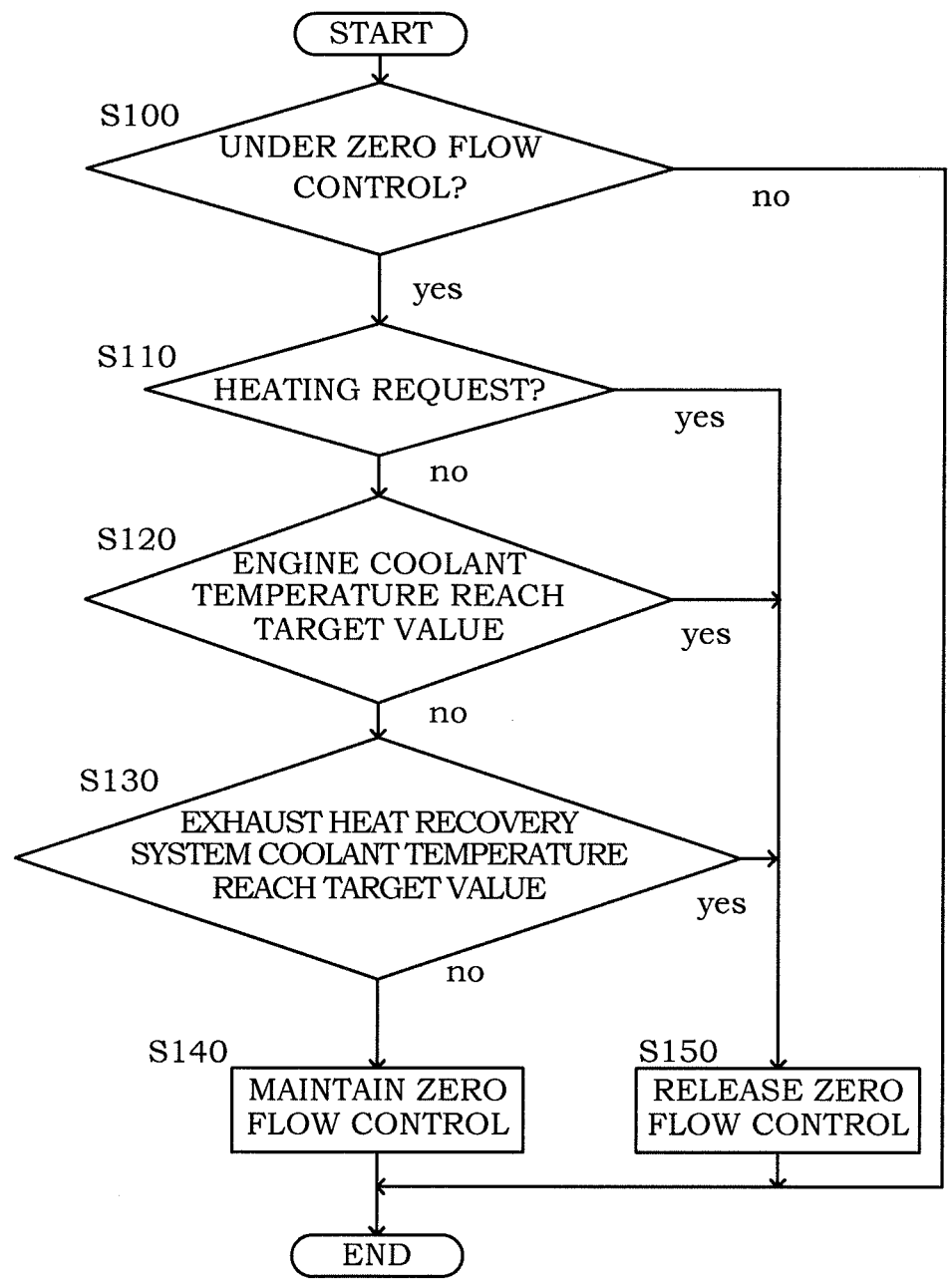
FIG. 7 is a flowchart for determining whether a zero flow control operation is maintained or released.

FIG. 7 is a flowchart illustrating a control routine for determining whether the zero flow control is continued or released after the engine starts. The control routine is repeated with a short interval such as 10 milliseconds.

In step S100, the ECM 12 determines whether or not the zero flow control is executed. When it is determined that the zero flow control is executed, the process of step S110 is executed. Otherwise, the control routine is terminated.

In step S110, the ECM 12 determines whether or not there is a heating request described below. When it is determined that there is the heating request, the zero flow control of step S150 is released, and the routine is terminated. Otherwise, when it is determined that there is no heating request, the process of step S120 is executed. When there is the heating request, the zero flow control is released because it is necessary to circulate the coolant to the heater 5 in order to perform a heating operation.

Here, how to determine whether or not there is the heating request will be described.

Figure 8:
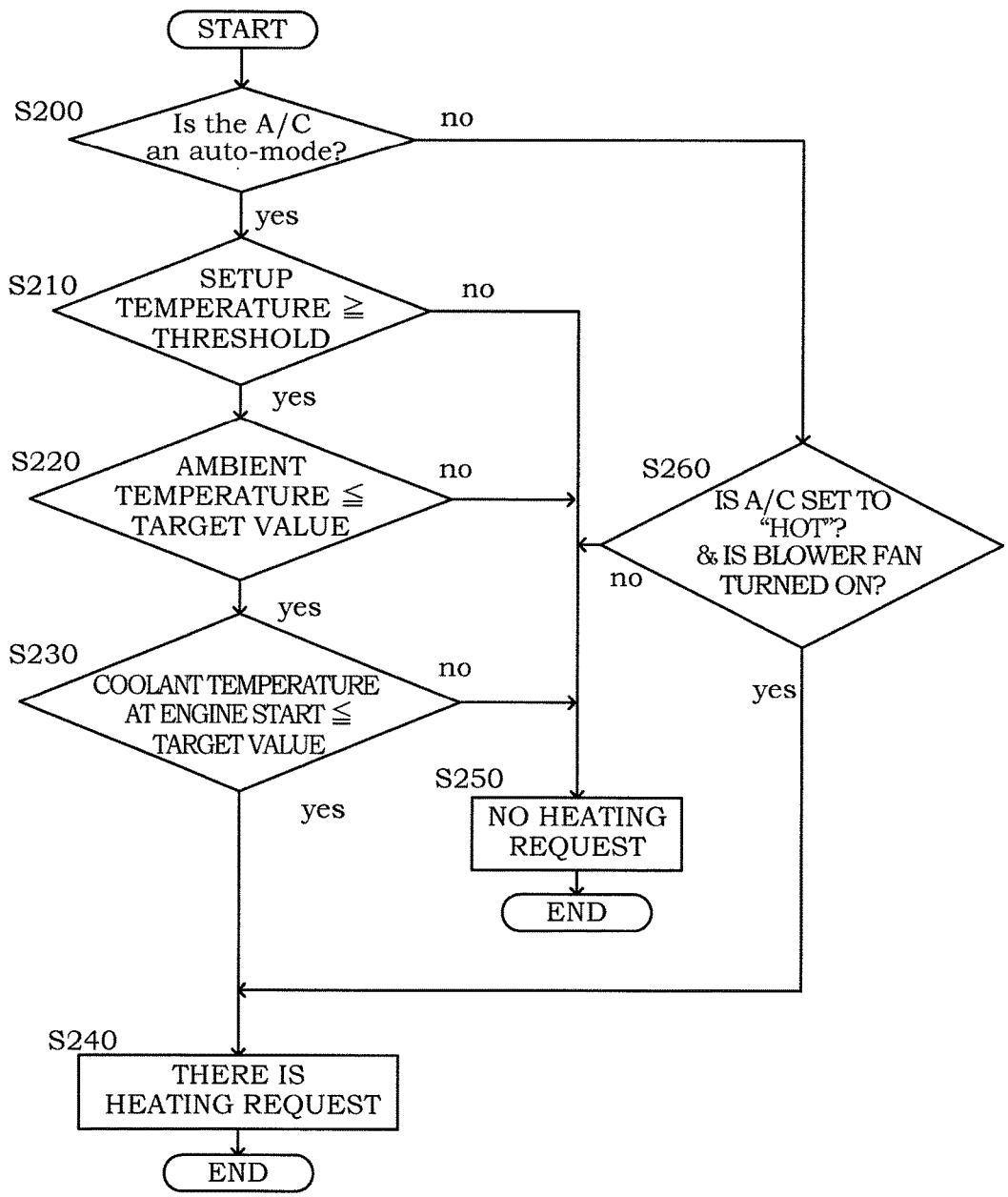
FIG. 8 is a flowchart for determining whether or not there is a heating request.

FIG. 8 is a flowchart illustrating a control routine for determining whether or not there is the heating request. This control routine is also repeated with a short interval such as 10 milliseconds.

In step S200, the ECM 12 determines whether or not an automatic mode is set in an air conditioner. It is noted that, when the automatic mode is set, an air blast amount or air outlet are automatically controlled to change a cabin temperature to a setup temperature set by a driver. In contrast, when a manual mode is set, a driver manually sets the air blast amount or the air outlet.

When the automatic mode is set, the ECM 12 executes the process of step S210. When the manual mode is set, the ECM 12 executes the process of step S260.

In step S210, the ECM 12 determines whether or not the setup temperature is equal to or higher than a threshold value. When it is determined that the setup temperature is equal to or higher than the threshold value, the process of step S220 is executed. Otherwise, it is determined that there is no heating request in step S250, and the process is executed. The threshold value used here refers to a lower limit of the temperature at which a heating operation is highly probably selected in the automatic mode. For example, the threshold value is set to approximately 25 to 28° C.

In step S220, the ECM 12 determines whether or not the ambient temperature is equal to or lower than a target value. When it is determined that the ambient temperature is equal to or lower than the target value, the process of step S230 is executed. Otherwise, the process of step S250 described above is executed. It is noted that the target value used here is a setup temperature set by a driver.

In step S230, the ECM 12 determines whether or not the coolant temperature at the engine start is equal to or lower than a target value. When the coolant temperature is equal to or lower than the target value, it is determined that there is the heating request in step S240, and the process is terminated. Otherwise, the process of step S250 described above is executed.

In step S260, the ECM 12 determines whether or not the air conditioner is set to "HOT" (heating) by the manual mode, and whether or not a blower fan switch is turned on. When it is determined that the air conditioner is set to "HOT," and the blower fan switch is turned on, it is determined that there is the heating request in step S240. Otherwise, it is determined that there is no heat request in step S250.

Returning to FIG. 7, when it is determined in step S110 that there is the heating request, the ECM 12 executes the process of step S120. When it is determined that there is no heating request, the zero flow control is released in step S150, and the routine is terminated.

In step S120, the ECM 12 determines whether or not the coolant temperature of the outlet duct of the internal combustion engine 1 reaches a target value (engine-side target value). When it is determined that the coolant temperature reaches the target value, the process of step S130 is executed. Otherwise, the process of step S150 described above is executed. The target value employed in this step is a predetermined temperature at which local boiling or bubbling of the coolant inside the internal combustion engine 1 can be prevented.

In step S130, the ECM 12 determines whether or not the coolant temperature inside the exhaust heat recovery system 6 estimated based on a method described below (hereinafter, also referred to as "internal coolant temperature of exhaust heat recovery system") reaches a target value (flow rate restricting threshold). The target value employed in this step is a predetermined temperature at which local boiling or bubbling of the coolant inside the exhaust heat recovery system 6 can be prevented.

Here, a description will be made for a method of estimating the internal coolant temperature of the exhaust heat recovery system 6.

Figure 9:
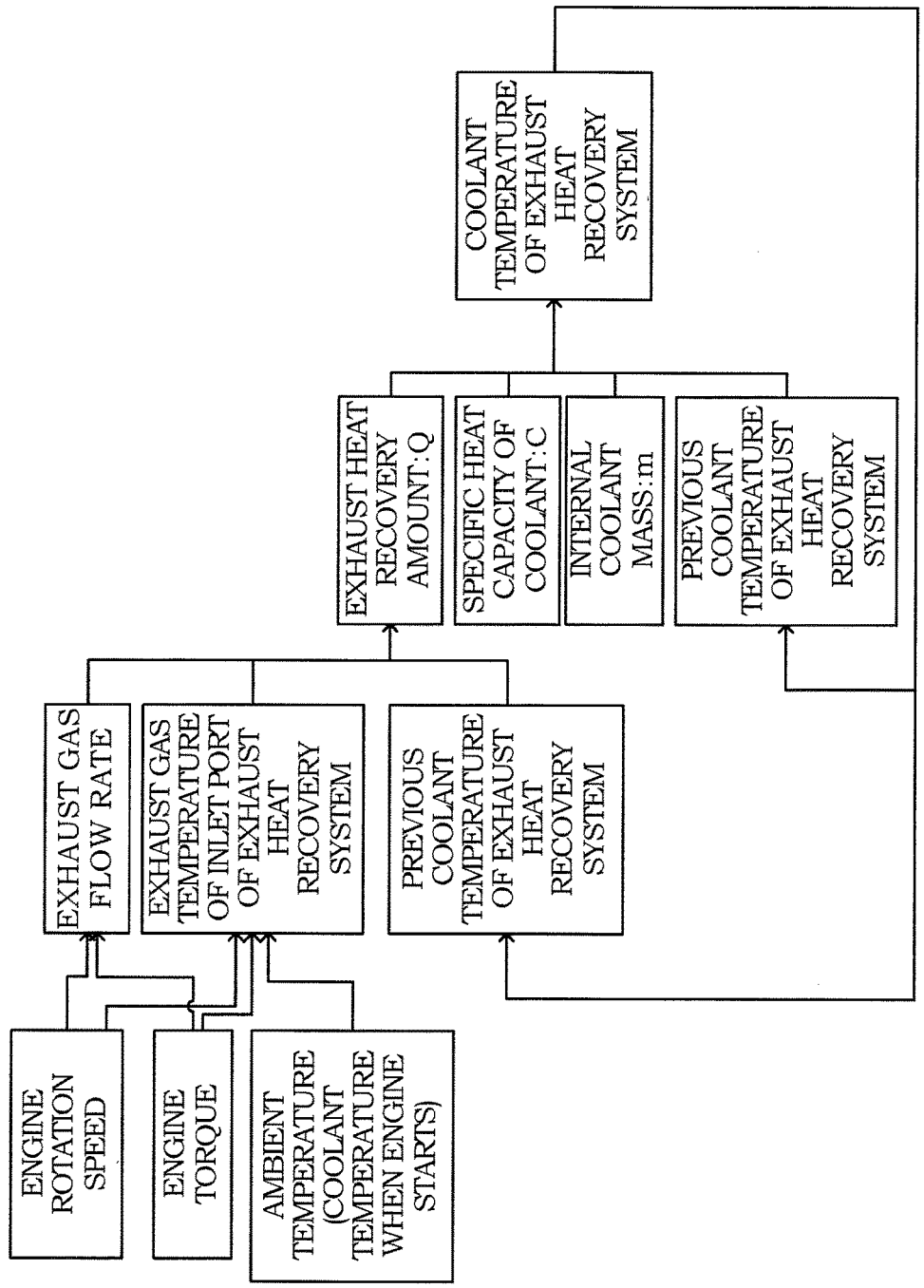
FIG. 9 is a block diagram for estimating an internal coolant temperature of the exhaust heat recovery system while the flow of the coolant stops.

FIG. 9 is a block diagram illustrating a method of estimating the coolant temperature of the exhaust heat recovery system when the coolant flow rate is set to zero through the zero flow control.

First, the ECM 12 reads a rotation speed of the internal combustion engine 1 (engine rotation speed), an engine torque, and an ambient temperature at the engine start. The engine rotation speed is computed based on a detection value of a crank angle sensor installed in the internal combustion engine as known in the art. The engine torque is obtained from a detection value of a throttle position sensor or an accelerator opening sensor installed in the internal combustion engine as known in the art. The ambient temperature is obtained by reading a detection value of an ambient temperature sensor installed in a vehicle as known in the art. It is noted that a coolant temperature at the engine start may be read instead of the ambient temperature.

The exhaust gas flow rate is computed based on the engine rotation speed and the engine torque. For example, a specification of the internal combustion engine 1, such as engine displacement and valve timings, is stored in advance, and the amount of the exhaust gas discharged from the internal combustion engine 1 is computed based on the reading values of the engine rotation speed and the engine torque. Alternatively, the exhaust gas flow rate may be obtained by creating a map representing a relationship between the engine rotation speed, the engine torque, and the exhaust gas flow rate in advance, and searching the reading values of the engine rotation speed and the engine torque in the map.

The exhaust gas temperature at the inlet port of the exhaust heat recovery system 6 (exhaust gas temperature of inlet port of exhaust heat recovery system) is computed based on the engine rotation speed, the engine torque, and the ambient temperature at the engine start. Similarly, this may be performed by creating a map in advance and searching the map.

As the exhaust gas flow rate and the exhaust heat recovery system inlet exhaust gas temperature are obtained, an exhaust heat recovery amount Q of the exhaust heat recovery system 6 is computed based on the obtained values and the coolant temperature of the exhaust heat recovery system computed in the previous computation (previous coolant temperature of exhaust heat recovery system). It is noted that, in an initial computation, a coolant temperature at the engine start is employed as the previous exhaust heat recovery system coolant temperature.

The exhaust heat recovery amount Q is proportional to a product of a temperature difference between the coolant and the exhaust gas flowing to the exhaust heat recovery system 6 and an exhaust gas flow rate passing through the exhaust heat recovery system 6. In this regard, the exhaust heat recovery amount Q is computed by creating a map representing a relationship between the temperature difference, the exhaust gas flow rate, and the exhaust heat recovery amount Q or formulating the relationship in advance and applying the map or the formula.

Formula (1) is established for a relationship between the exhaust heat recovery amount Q obtained in this manner and a variation $\Delta T$ of the internal coolant temperature of the exhaust heat recovery system 6 (hereinafter, simply referred to as a "temperature variation $\Delta T$"):

$$Q = m \cdot C \cdot \Delta T \quad (1),$$

where "m" denotes a mass of the internal coolant of the exhaust heat recovery system 6 (internal coolant mass), and "C" denotes a specific heat capacity of the coolant.

The specific heat capacity C of the coolant is a constant, and the internal coolant mass m during the zero flow control is also a constant. Therefore, if the exhaust heat recovery amount Q is obtained, it is possible to compute the temperature variation $\Delta T$ based on Formula (1).

For this purpose, the specific heat capacity C of the coolant, the internal coolant mass m, and Formula (1) are stored in advance, and the temperature variation $\Delta T$ is computed by using the obtained exhaust heat recovery amount Q. The computed temperature variation $\Delta T$ is added to the previous coolant temperature of the exhaust heat recovery system, and this addition result is set as the current coolant temperature of the exhaust heat recovery system.

As described above, an operation of reducing the coolant flow rate is also included in the zero flow control. For example, as illustrated in FIG. 10, the coolant passage 14 having the throttle chamber 4 joins to the coolant passage 11A in the upstream of the exhaust heat recovery system 6, and a three-way valve 30 is provided in the downstream side of the exhaust heat recovery system 6, an operation of fully closing the multi-flow control valve 2 and bypassing the heater 5 through the three-way valve 30 is also included in the zero flow control.

Figure 10:
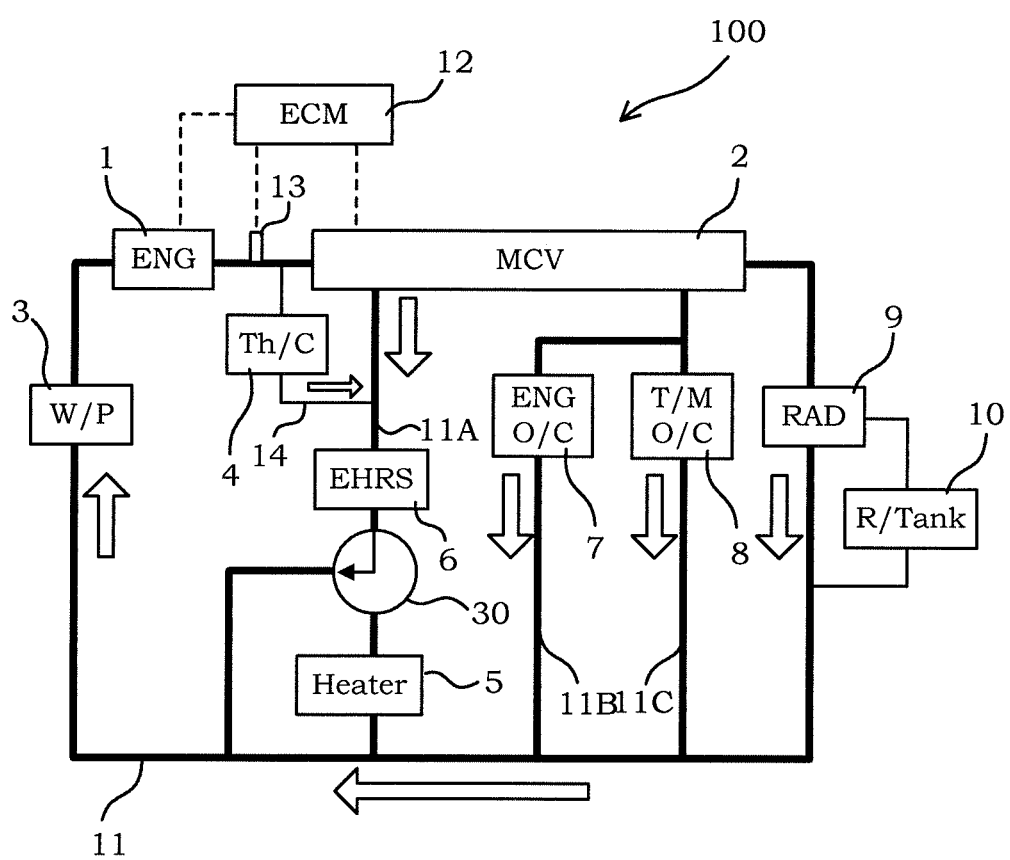
FIG. 10 is a schematic diagram illustrating another exemplary cooling system.
Figure 11:
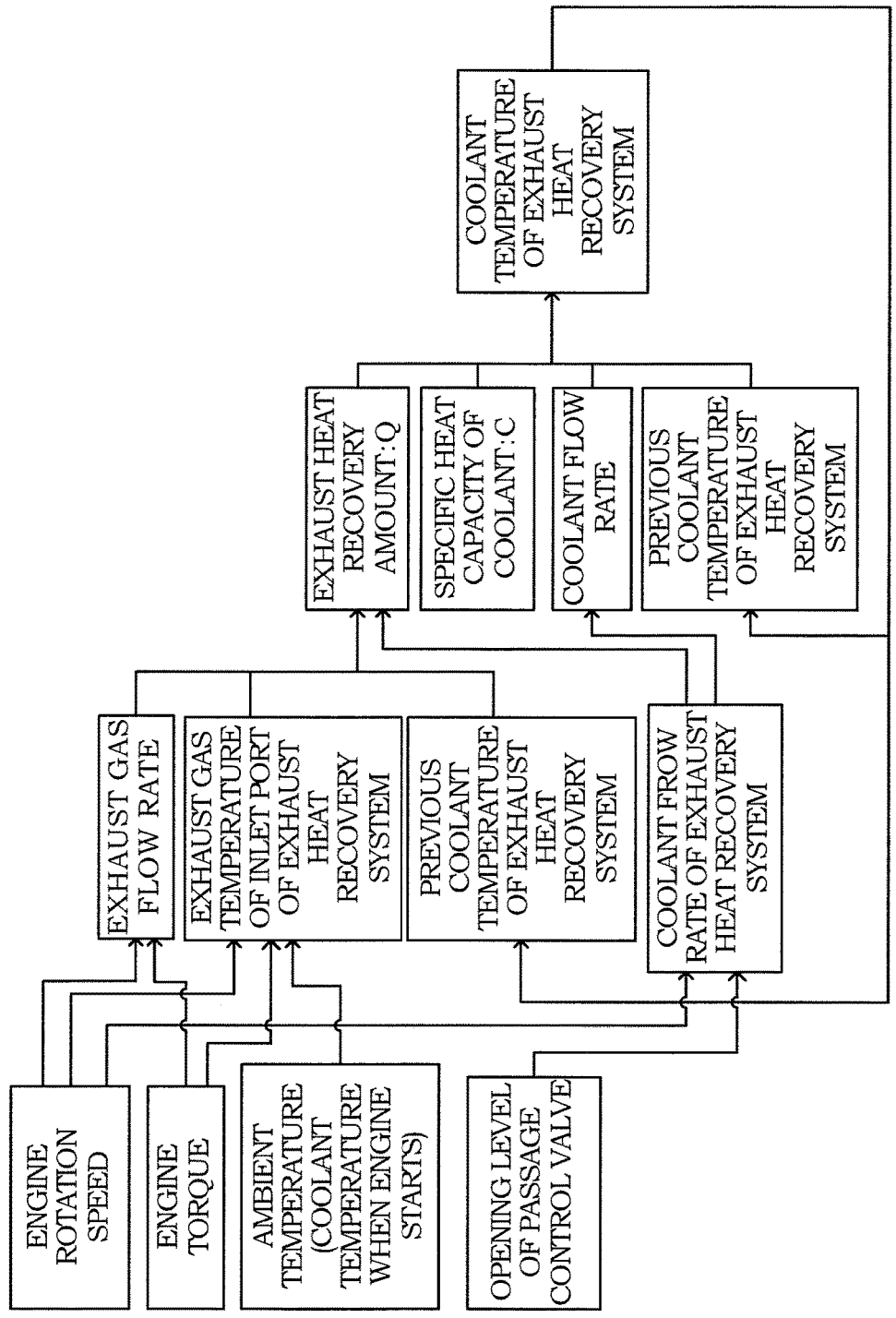
FIG. 11 is a block diagram illustrating a configuration for estimating the internal coolant temperature of the exhaust heat recovery system while the coolant flows.

FIG. 11 is a block diagram illustrating a method of estimating the coolant temperature of the exhaust heat recovery system when the coolant passes through the exhaust heat recovery system 6 even in the zero flow control as illustrated in FIG. 10.

Unlike FIG. 9, the amount of the coolant flowing through the exhaust heat recovery system 6 (coolant flow rate of exhaust heat recovery system) is computed. In addition, in order to compute the exhaust heat recovery amount Q, the coolant flow rate of the exhaust heat recovery system is employed in addition to the parameters of FIG. 9. Furthermore, the internal coolant mass m of Formula (1) is a mass based on the coolant flow rate of the exhaust heat recovery system.

When the water pump 3 is driven by the internal combustion engine 1 as illustrated in FIG. 2, the coolant flow rate of the exhaust heat recovery system can be computed on the basis of the engine rotation speed, a rotation speed of the impeller 43 obtained from the rotation speed ratio of the engine pulley 40 and the pump pulley 41, and an valve opening level of the multi-flow control valve 2. Meanwhile, when the water pump 3 is driven by the electric motor 50 as illustrated in FIG. 3, the coolant flow rate of the exhaust heat recovery system can be computed on the basis of a rotation speed of the impeller 43 obtained from the rotation speed of the electric motor 50 and the valve opening level of the multi-flow control valve 2.

The exhaust heat recovery amount is obtained by integrating the coolant flow rate of the exhaust heat recovery system to a product of the temperature difference between the coolant and the exhaust gas flowing to the exhaust heat recovery system 6 and the exhaust gas flow rate passing through the exhaust heat recovery system 6.

The current coolant temperature of the exhaust heat recovery system is estimated from the exhaust heat recovery amount Q obtained as described above, the specific heat capacity C of the coolant, the internal coolant mass m, and the previous coolant temperature of the exhaust heat recovery system.

As described above, the coolant temperature of the exhaust heat recovery system is estimated in different ways depending on whether or not the coolant flows in the zero flow control.

Returning to FIG. 7, when it is determined in step S130 that the coolant temperature of the exhaust heat recovery system does not reach the target value, the ECM 12 maintains the zero flow control in step S140 and terminates the routine. When it is determined that the coolant temperature of the exhaust heat recovery system reaches the target value, the ECM 12 release the zero flow control in step S150 and terminates the routine.

It is noted that, in the aforementioned description, the coolant temperature of the exhaust heat recovery system is estimated through computation by considering a detection value of the coolant temperature sensor 13 provided in the outlet duct of the internal combustion engine 1 as the internal coolant temperature of the internal combustion engine 1. However, any configuration may also be employed as a unit for obtaining the coolant temperature or the coolant pressure of the engine coolant passage and a unit for obtaining the internal coolant temperature or pressure of the exhaust heat recovery system 6 without limiting thereto. Alternatively, a sensor for detecting the internal coolant temperature of the internal combustion engine 1 or a sensor for detecting the internal coolant temperature of the exhaust heat recovery system 6 may be provided to directly detect the necessary values. In this case, the computations of FIGS. 9 and 11 are not necessary. Therefore, it is possible to reduce a computation load. However, due to installation of additional sensors, the cost increases, and the size of the exhaust heat recovery system 6 increases. In addition, since holes are necessary to install the sensors, a heat transfer area of the exhaust heat recovery system 6 is reduced, and heat exchange efficiency is degraded.

In steps S120 and S130 of FIG. 7, a possibility of boiling or bubbling is determined based on the coolant temperature. However, any one or both of the possibilities of boiling and bubbling may be determined based on the coolant pressure. This is because boiling or bubbling can be detected on the basis of a variation of the internal pressure of the cooling passage that may be generated by boiling or bubbling.

The target value employed in steps S120 and S130, that is, the target value for determining whether or not bubbling is probably generated is set to be lower as an area where bubbles are easy to stay increases when bubbles are generated in the coolant passage 11 (including the coolant passages 11A to 11C).

Figure 12:
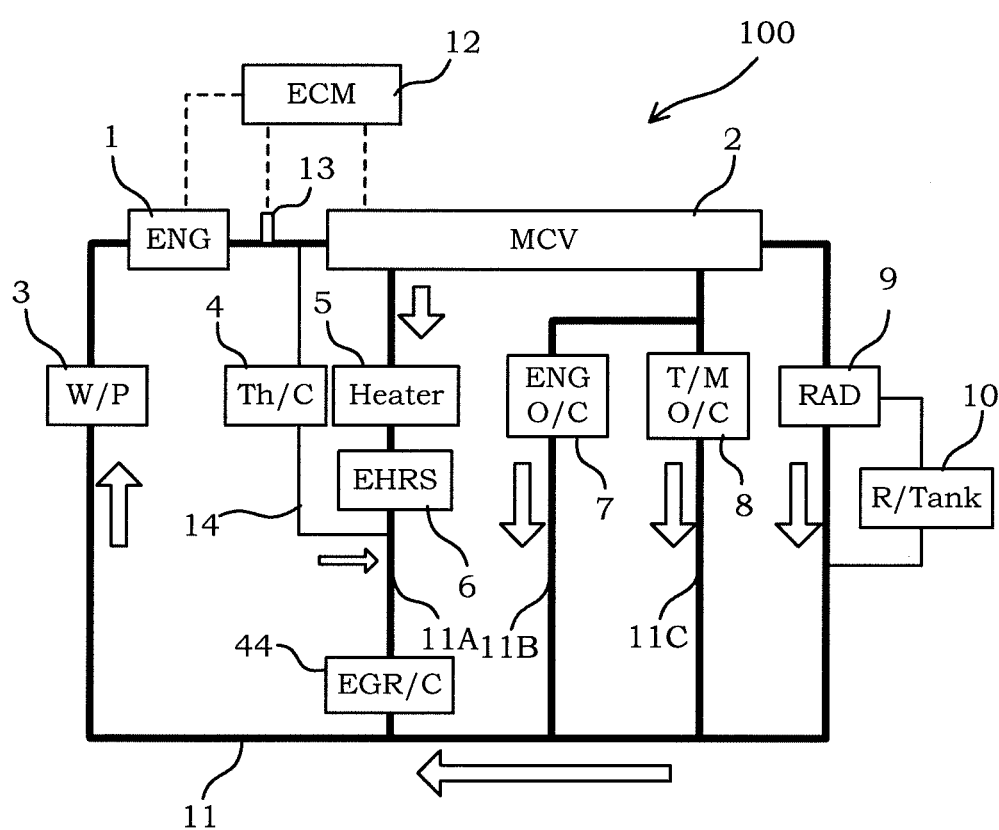
FIG. 12 is a schematic diagram illustrating further another exemplary cooling system.

The area where bubbles are easy to stay refers to, for example, a portion branching to a plurality of narrow flow paths, such as a heat exchanger. In particular, if an heat exchanger such as an exhaust gas recirculation (EGR) cooler 44 is arranged in the coolant passage 11 between the exhaust heat recovery system 6 and the radiator 9 as illustrated in FIG. 12, the coolant having a temperature heated by the exhaust heat recovery system 6 flows to the EGR cooler 44 without cooling. Therefore, bubbles are easy to stay in the EGR cooler 44. In addition, if bubbles stay in the inlet port of the narrow flow path such as the EGR cooler 44, and the narrow path is clogged by the bubbles, the influent coolant is rejected by the bubbles and makes a burbling sound.

Figure 13:
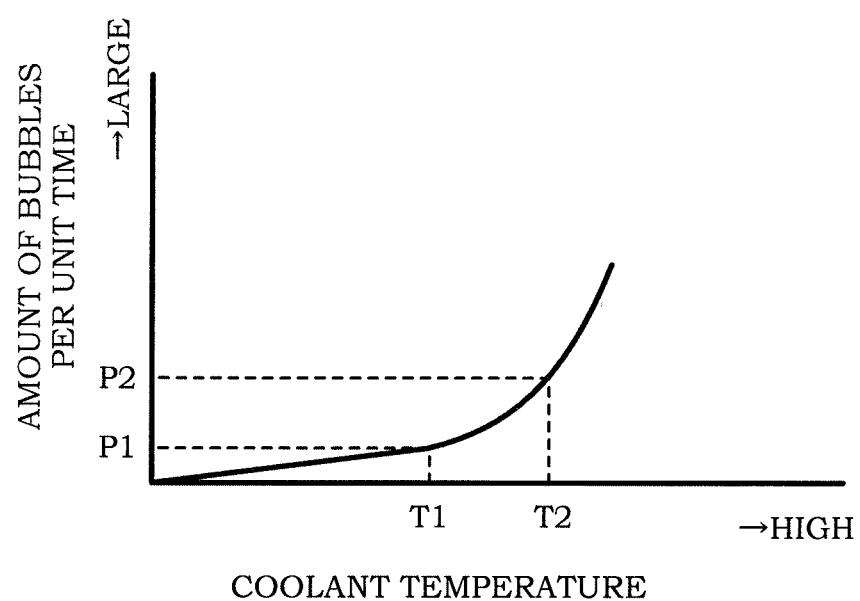
FIG. 13 is a diagram illustrating a relationship between the coolant temperature and the amount of bubbles generated per unit time.

In this regard, for example, in the configuration of FIG. 12, in order to more reliably prevent bubbling, the target value for determining whether or not bubbles are probably generated is set to be lower, compared to the configuration of FIG. 1. In general, the coolant starts to generate bubbles in the vicinity of the boiling point. However, bubbles are probably generated even at a temperature much lower than the boiling point, for example, when the air is mixed. That is, as illustrated in FIG. 13, the amount of bubbles per unit time decreases as the coolant temperature decreases. In addition, the amount of bubbles per unit time increases as the coolant temperature increases. Based on this characteristic, assuming the target value is set to, for example, "T2" in the configuration of FIG. 1, the target value is set to a temperature "T1" lower than "T2" when there is the area where bubbles are easy to stay as illustrated in FIG. 12. As a result, the amount of bubbles generated per unit time is reduced from "P2" to "P1," so that it is possible to more reliably prevent generation of bubbles.

Next, a description will be made for functional effects of the embodiment of this invention.

According to this embodiment, the zero flow control for restricting the coolant flow rate is executed in a cold start operation of the internal combustion engine 1, and the zero flow control is released on the basis of the coolant temperature or pressure of the engine coolant passage and the internal coolant temperature or pressure of the exhaust heat recovery system 6.

More specifically, the zero flow control is released when the coolant temperature or pressure of the engine coolant passage reaches the engine-side target value or when the internal coolant temperature or pressure of the exhaust heat recovery system 6 reaches the flow rate restricting threshold.

When the time elapsing until the internal combustion engine 1 is warmed up is reduced by virtue of the zero flow control, a combustion state is stabilized within a short time, and as a result, fuel efficiency is improved. In addition, after the zero flow control is released, a temperature rise of the coolant is promoted by the exhaust heat recovery system 6, so that the heated coolant promotes heating of the engine oil or the transmission oil. As a result, fuel efficiency is improved. Furthermore, local boiling or bubbling is probably generated in the internal combustion engine 1 and the exhaust heat recovery system 6 during the zero flow control. However, the zero flow control is released when the coolant temperature of either the internal combustion engine 1 or the exhaust heat recovery system 6 reaches a temperature at which the possibility of boiling or bubbling is high. Therefore, it is possible to more reliably prevent generation of boiling or bubbling.

That is, it is possible to improve fuel efficiency through the zero flow control while problems caused by boiling or bubbling of the coolant are avoided. In addition, it is possible to improve fuel efficiency by using the exhaust heat recovered by the exhaust heat recovery system 6.

According to this embodiment, the internal coolant temperature of the exhaust heat recovery system 6 is estimated by using a variation of the internal coolant temperature of the exhaust heat recovery system 6 computed on the basis of the exhaust heat recovery amount caused by the exhaust heat recovery system 6, the specific heat capacity of the coolant, and the mass of the internal coolant of the exhaust heat recovery system 6. As a result, it is possible to estimate the internal coolant temperature of the exhaust heat recovery system 6 without installing a new sensor in addition to the existing coolant temperature sensor 13. Therefore, it is possible to prevent disadvantages caused by installation of additional sensors, such as a cost increase, a component size increase, or degradation of heat exchange efficiency caused by reduction of the heat transfer area of the exhaust heat recovery system 6.

According to this embodiment, during the zero flow control where a coolant flow rate is set to zero, the ECM 12 computes the exhaust heat recovery amount Q on the basis of the exhaust gas flow rate obtained from the engine rotation speed and the engine torque, the exhaust gas temperature of the inlet port of the exhaust heat recovery system 6 obtained from the engine rotation speed, the engine torque, and the coolant temperature or the ambient temperature in the engine start operation, and the previous internal coolant temperature of the exhaust heat recovery system 6.

During the zero flow control where a coolant flow rate is not set to zero, the ECM 12 computes the exhaust heat recovery amount Q on the basis of the exhaust gas flow rate obtained from the engine rotation speed and the engine torque, the exhaust gas temperature of the inlet port of the exhaust heat recovery system 6 obtained from the engine rotation speed, the engine torque, and the coolant temperature or the ambient temperature in the engine start operation, the previous internal coolant temperature of the exhaust heat recovery system 6, and the internal coolant flow rate of the exhaust heat recovery system 6 obtained from the engine rotation speed and the valve opening level of the multi-flow control valve 2.

As a result, it is possible to estimate the internal coolant temperature of the exhaust heat recovery system 6 with high accuracy depending on the coolant flow rate during the zero flow control.

According to this embodiment, when a heat exchanger such as the EGR cooler 44 or the oil cooler is interposed in the coolant passage 11 between the outlet port of the exhaust heat recovery system 6 and the inlet port of the radiator 9, the flow rate restricting threshold is set to be lower, compared to a case where no component is interposed. As a result, it is possible to more reliably prevent generation of boiling or bubbling of the coolant.

According to this embodiment, assuming that the coolant pressure is employed instead of the coolant temperature, the zero flow control is released when either a variation of the coolant pressure of the engine coolant passage or a variation of the internal coolant pressure of the exhaust heat recovery system 6 reaches a pressure variation threshold. As a result, similar to a case where the coolant temperature is employed, it is possible to improve fuel efficiency through the zero flow control while problems caused by generation of boiling or bubbling of the coolant can be avoided. In addition, it is possible to improve fuel efficiency by using the exhaust heat recovered by the exhaust heat recovery system 6.

While embodiments of the invention have been described in detail hereinbefore with reference to the accompanying drawings, they are not intended to limit the invention to such a specific configuration. Instead, it would be appreciated by those skilled in the art that the embodiments may be changed or modified in various forms within the spirit and scope of the invention and equivalents thereof.

The invention claimed is:

1. A cooling system controller that controls a cooling system at least having a coolant pump configured to supply a coolant to an engine coolant passage provided in an internal combustion engine, a heat radiator configured to radiate heat from the coolant passing through the engine coolant passage to the external air to lower a temperature of the coolant, and an exhaust heat recovery system configured to perform heat exchange from an exhaust gas of the internal combustion engine to the coolant, the cooling system controller comprising:

a coolant passage that links the engine coolant passage and the heat radiator;

an exhaust heat recovery coolant passage that branches from the coolant passage at a point between an outlet port of the engine coolant passage and an inlet port of the heat radiator and joins to the coolant passage at a point between an outlet port of the heat radiator and an inlet port of the engine coolant passage, the exhaust heat recovery system being arranged in the exhaust heat recovery coolant passage;

a multi-flow control valve disposed at the point where the exhaust heat recovery coolant passage branches from the coolant passage and configured to select a coolant flow passage out of the coolant passage and the exhaust heat recovery coolant passage; and a coolant flow rate control unit that controls a coolant flow rate flowing through the cooling system, wherein the coolant flow rate control unit controls the coolant flow rate flowing through the cooling system by switching a coolant flow passage by using the multi-flow control valve, and wherein, the exhaust heat recovery system is arranged in the exhaust heat recovery coolant passage at a point after the exhaust heat recovery coolant passage branches from the coolant passage.

2. The cooling system controller according to claim 1, wherein a restriction of the coolant flow rate is released at least when a variation of a coolant temperature or pressure of the engine coolant passage reaches an engine-side target value or when a variation of an internal coolant temperature or pressure of the exhaust heat recovery system reaches a flow rate restricting threshold.

3. The cooling system controller according to claim 2, wherein the flow rate restricting threshold is set to be lower when a heat exchanger such as an exhaust gas recirculation (EGR) cooler or an oil cooler is interposed in the coolant passage between the outlet port of the exhaust heat recovery system and the inlet port of the heat radiator, compared with a case when the heat exchanger is not interposed.

4. The cooling system controller according to claim 1, wherein an exhaust heat recovery system internal-condition obtaining unit configured to obtain an internal coolant temperature or pressure of the exhaust heat recovery system estimates the internal coolant temperature of the exhaust heat recovery system by using a variation of the internal coolant temperature of the exhaust heat recovery system obtained on the basis of an exhaust heat recovery amount recovered by the exhaust heat recovery system, a specific heat capacity of the coolant, and a mass of the internal coolant of the exhaust heat recovery system.

5. The cooling system controller according to claim 4, wherein, when the coolant flow rate is restricted, an exhaust heat recovery system internal-condition obtaining unit computes an exhaust heat recovery amount on the basis of an exhaust gas flow rate obtained from an engine rotation speed and an engine torque, an exhaust gas temperature of an inlet port of the exhaust heat recovery system obtained from the engine rotation speed, the engine torque, and an ambient temperature detected by an ambient temperature sensor at an engine start or a coolant temperature of the engine coolant passage at an engine start, and a previous internal coolant temperature of the exhaust heat recovery system.

6. The cooling system controller according to claim 4, wherein, when the coolant flow rate is not restricted, the exhaust heat recovery system internal-condition obtaining unit computes an exhaust heat recovery amount on the basis of the exhaust gas flow rate obtained from the engine rotation speed and the engine torque, the exhaust gas temperature of the inlet port of the exhaust heat recovery system obtained from the engine rotation speed, the engine torque, and an ambient temperature detected by an ambient temperature sensor at the engine start or a coolant temperature detected by a coolant temperature sensor at the engine start, the previous internal coolant temperature of the exhaust heat recovery system, and an internal coolant flow rate of the exhaust heat recovery system obtained from the engine rotation speed and a valve opening level of the multi-flow control valve.

7. The cooling system controller according to claim 1, wherein a restriction of the coolant flow rate is released when either a pressure variation of a coolant pressure of the engine coolant passage or a pressure variation of an internal coolant pressure of the exhaust heat recovery system reaches a pressure variation threshold.

8. The cooling system controller according to claim 1, wherein the cooling system further has a warming heater in the exhaust heat recovery coolant passage between the exhaust heat recovery system and the coolant pump.

9. A method of controlling a cooling system at least having a coolant pump configured to supply a coolant to an engine coolant passage provided in an internal combustion engine, a heat radiator configured to radiate heat from the coolant passing through the engine coolant passage to the external air to lower a temperature of the coolant, a coolant passage that links the engine coolant passage and the heat radiator, an exhaust heat recovery system, arranged in an exhaust heat recovery coolant passage that branches from the coolant passage at a point between an outlet port of the engine coolant passage and an inlet port of the heat radiator and joins to the coolant passage at a point between an outlet port of the heat radiator and an inlet port of the engine coolant passage, the exhaust heat recovery system arranged in the exhaust heat recovery coolant passage at a point after the exhaust heat recovery coolant passage branches from the coolant passage and configured to perform heat exchange from the exhaust gas of the internal combustion engine to the coolant, a coolant flow rate control unit configured to control a coolant flow rate flowing through the cooling system, and a multi-flow control valve disposed at the point where the exhaust heat recovery coolant passage branches from the coolant passage and configured to select a coolant flow passage out of the coolant passage and the exhaust heat recovery coolant passage, wherein restriction of the coolant flow rate and releasing of the restriction of the coolant flow rate are performed by switching a coolant flow passage by using the multi-flow control valve.

\* \* \* \* \*